Patented Feb. 19, 1935

1,991,482

UNITED STATES PATENT OFFICE 1,991,482

RHODAMINE DYES

Otto Allemann, Wilmington, Del., assignor to E. I. du Pont de Nemours & Company, Wilmington, Del., a corporation of Delaware No Drawing. Application March 24, 1932. Serial No. 601,061

12 Claims. (Cl. 260—63)

This invention relates to rhodamine dyes and more particularly to halogenated rhodamine dyes.

The object of this invention is the production of halogenated rhodamine dyestuffs. Further objects are the production of rhodamine dyestuffs capable of dyeing silks and wool in fast brilliant shades ranging from red to violet; and the production of halogenated rhodamine dyestuffs soluble in dilute alkaline solution. Additional objects will appear hereinafter.

These objects are attained by the process of the present invention whereby a halogenated aryl-meta-amido-phenol of the benzene series is condensed with phthalic anhydride and the condensation product sulfonated. These objects may also be attained by condensing a halogenated primary amine of the benzene series with fluorescein dichloride and sulfonating the subsequent condensation product.

This invention may be more completely understood by a consideration of the following examples wherein the parts given are all by weight:

Example I

| | Parts |
|---|---|
| Fluorescein dichloride | 8 |
| 6-chlor-o-toluidine (1CH$_3$, 2NH$_2$, 6Cl) | 15 |
| Anhydrous zinc chloride | 2 |
| Zinc oxide | 2 | were heated to 210–220° C. The melt was at first liquid, but solidified gradually. After cooling it was ground and boiled several times with dilute hydrochloric acid. It was then filtered, washed with water and dried. The dyestuff was sulfonated in the following way:

One (1) part was dissolved in 5 parts of sulfuric acid (100%) below 15° C. The temperature was then allowed to rise to 20–40° C. until a test portion was soluble in a dilute solution of soda ash. The mixture was poured on ice, the dye filtered off and converted into the sodium salt.

Example II

| | Parts |
|---|---|
| Phthalic anhydride | 40 |
| 6-chlor-o-tolyl-meta-amido-phenol | 30 |
| Anhydrous zinc chloride | 12 | were slowly heated up to 200° C. and this temperature maintained until the fusion became thick. The cold fusion mass was ground to a fine powder and extracted with hot dilute caustic soda solution. The residue was filtered off, washed and dried. The sulfonation was carried out in the same way as given under Example I.

Example III

| | Grams |
|---|---|
| Fluorescein dichloride | 12 |
| 5-chlor-o-toluidine | 25 |
| Anhydrous zinc chloride | 3 |
| Zinc oxide | 3 | were heated to 210–220° C. until the melt became thick. When cold the mass was ground to a fine powder, extracted with boiling dilute hydrochloric acid, filtered, washed and dried. The sulfonation was carried out in the same way as under Example I.

Example IV

| | Grams |
|---|---|
| Fluorescein dichloride | 12 |
| o-chloraniline | 20 |
| Anhydrous zinc chloride | 3 |
| Zinc oxide | 3 | were heated to 210–220° C. until the fusion became thick. The cold mass was ground, extracted with boiling dilute hydrochloric acid, filtered, washed and dried. It was sulfonated as indicated in Example I.

Example V

| | Grams |
|---|---|
| Fluorescein dichloride | 8 |
| p-bromaniline | 15 |
| Anhydrous zinc chloride | 2 |
| Zinc oxide | 2 | were heated to 210–220° C. until the fusion mass became hard. When cold the mass was finely ground, extracted with hot dilute hydrochloric acid, filtered, washed and dried. It was then sulfonated in the usual way.

In place of the halogenated primary amine of the benzene series, mentioned in the above examples, it is possible to substitute any other halogenated primary amine of the benzene series with comparable results. Very satisfactory results may also be obtained by substituting any other halogenated aryl-meta-amido-phenol of the benzene series for 6-chlor-o-tolyl-meta-amido-phenol, mentioned in Example II.

The rhodamines produced by the process of this invention have the following general formula:

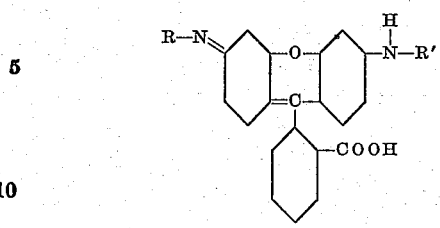

in which R and R' are halogenated members of the benzene series which may have substituted thereon members of the alkyl group, and in which R' also has substituted thereon a sulfonic acid group.

The products of the present invention produce brilliant shades which are in great demand by textile manufacturers and commercial dyeing establishments. These shades are not only very attractive but are extremely fast to washing, and retain their original brilliance after repeated washings. The shades range from red to violet, according to the compounds used, and provide a wide range from which to choose.

As many apparently widely different embodiments of this invention may be made without departing from the spirit and scope thereof, it is to be understood that I do not limit myself to the specific embodiments thereof, except as defined in the appended claims.

I claim:

1. A process of producing rhodamine dyes which comprises condensing a halogenated primary amine of the benzene series with fluorescein dichloride and sulfonating the condensed product.

2. A process of producing rhodamine dyes which comprises condensing a halogenated toluidine with fluorescein dichloride and sulfonating the condensed product.

3. A process of producing rhodamine dyes which comprises condensing a halogenated-o-toluidine with fluorescein dichloride and sulfonating the condensed product.

4. A process of producing rhodamine dyes which comprises condensing 6-chlor-o-toluidine with fluorescein dichloride and sulfonating the condensed product.

5. Compounds whose formula is:

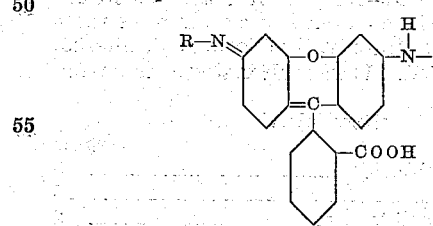

in which R and R' represent the residues of halogenated primary amines of the benzene series, and in which R' also contains a sulfonic acid group.

6. Dyes having the following general formula:

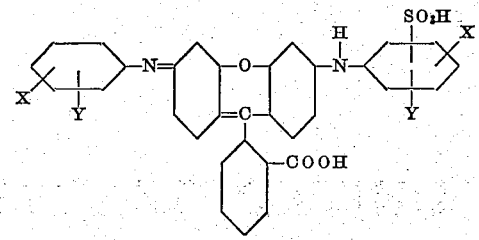

wherein X represents hydrogen or an alkyl group, and Y represents a halogen group.

7. Dyes having the following general formula:

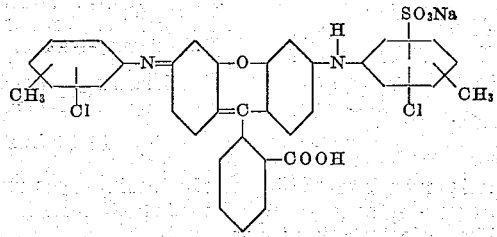

8. Compounds whose formula is:

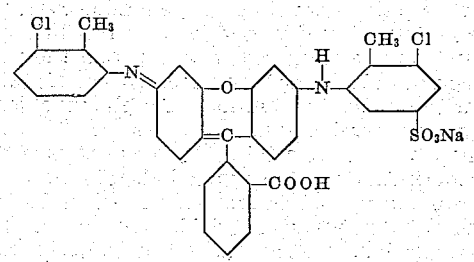

9. Animal fibers or fabrics whose color is due to the product of claim 5.

10. Animal fibers or fabrics whose color is due to the product of claim 8.

11. Animal fibers or fabrics whose color is due to the product of claim 6.

12. Animal fibers or fabrics whose color is due to the product of claim 7.

OTTO ALLEMANN.